(12) United States Patent
Moretto (10) Patent No.: US 7,722,761 B2
(45) Date of Patent: May 25, 2010

(54) FILTERING DEVICE WITH FLOW ADJUSTER (75) Inventor: Maurizio Moretto, Vicenza (IT)

(73) Assignee: Laica S.p.A., Barbarano Vicentino (VI) (IT)

( * ) Notice: Subject to any disclaimer, the term of this patent is extended or adjusted under 35 U.S.C. 154(b) by 138 days.

(21) Appl. No.: 11/983,331

(22) Filed: Nov. 8, 2007

(65) Prior Publication Data

US 2008/0073255 A1    Mar. 27, 2008

(51) Int. Cl.
*B01D 35/157*   (2006.01)
(52) U.S. Cl. .................. 210/109; 210/116; 210/121; 210/474; 222/189.06
(58) Field of Classification Search ......... 210/109–119, 210/121, 473–476, 245; 141/21; 99/299; 222/189.06, 189.07
See application file for complete search history.

(56) References Cited

U.S. PATENT DOCUMENTS 590,293 A * 9/1897 Allen et al. .................. 210/109

5,900,138 A    5/1999 Moretto

FOREIGN PATENT DOCUMENTS

| EP | 0235315 | 9/1987 |
| EP | 0349315 | 1/1990 |
| WO | WO 9613318 A1 * | 5/1996 |

* cited by examiner

*Primary Examiner*—Terry K Cecil
(74) *Attorney, Agent, or Firm*—Gottlieb, Rackman & Reisman (57) ABSTRACT

A filtering device for filtering water and liquids in general comprises a first reservoir for collecting the water to be filtered, a second reservoir for collecting the filtered water, which reservoir is supplied by falling from the first reservoir, a conduit which extends from the first reservoir into the second reservoir, a cartridge type filtering element which is removably received in the conduit, a discharge hole for the filtered water that is positioned between the conduit and the second reservoir, and at least one opening for access to the cartridge provided at an end of the conduit that is distal from the first reservoir in order to promote the removal thereof. The device comprises an at least partial closure which can be removably fitted to the conduit in the region of the opening for access to the cartridge and comprises a flow adjuster which is associated with the conduit in order to adjust the flow of water flowing from the first reservoir to the second reservoir through the discharge hole.

18 Claims, 5 Drawing Sheets

FILTERING DEVICE WITH FLOW ADJUSTER

TECHNICAL SCOPE

The present invention relates to a filtering device for filtering water and liquids in general including the features set out in the preamble of the main claim.

STATE OF THE ART

Such devices are known and widespread in the marketplace owing to their capacity to provide, at a domestic level, drinking water which has improved characteristics, both chemical characteristics (salinity, hardness, etc.) and organoleptic characteristics in comparison with tapwater.

A typical example of such devices is described in WO9613318 from the same applicant. The filtering device set out therein is of the type involving a jug with filtration by gravity, wherein the water introduced into the upper reservoir passes slowly into the lower reservoir, running through a filter cartridge which contains filtering elements with activated carbon and ion exchange.

The filtering efficacy of the cartridge depends on various factors, among which the contact time between the filtering means and the water to be filtered has obvious importance. The passage of the water into the cartridge is brought about by gravity and therefore the flow, understood as flow rate over a unit of time, varies in accordance with the pressure differential upstream and downstream of the cartridge, which in turn depends both on the water level in the upper reservoir for collecting the water to be filtered and on the level of filtered water in the lower reservoir.

Consequently, the filtered water has variable characteristics during the filtering phase. There is known on the market a filtering jug, wherein the conduit which receives the filter cartridge is closed at the bottom and has a discharge opening for the filtered water that is positioned in the vicinity of the upper reservoir. In that manner, the influence of the degree of filling of the lower reservoir on the flow of filtered water is substantially cancelled out.

However, this solution involves some obvious disadvantages. A first disadvantage consists in that, although the gradual filling of the lower reservoir does not influence the flow rate at the discharge opening for the filtered water, that flow rate is nevertheless irregular and non-constant with respect to the varying level in the upper reservoir. Furthermore, the conduit for receiving the cartridge is not accessible from below in order to facilitate the removal of the used cartridge during replacement thereof. Therefore, it is necessary to provide geometries and forms for the cartridge portion protruding into the upper reservoir which allow it to be gripped and removed, which, in addition to determining the overall geometry of the cartridge, influences its dimensions and interchangeability with cartridges from other manufacturers.

Another disadvantage consists in the difficulty of cleaning the seat for receiving the cartridge during maintenance of the filtering device. Since the conduit is closed at the bottom, it is similarly inaccessible.

Another disadvantage concerns the possibility of regulating the filtering flow. That may be required, for example, in order to adapt the flow in accordance with the hardness parameters or the organoleptic conditions of the water to be filtered. For example, during summer-time the water may smell strongly of chlorine, the neutralisation of which can require greater filtering times than those necessary during winter-time.

DESCRIPTION OF THE INVENTION

The technical problem addressed by the present invention is to provide a filtering device for filtering water and liquids in general, which device is structurally and functionally adapted to overcome the disadvantages set out with reference to the prior art cited.

This problem is solved by the invention with a filtering device for filtering water and liquids in general, which device is constructed in accordance with the appended claims.

BRIEF DESCRIPTION OF THE DRAWINGS

The features and advantages of the invention will be better understood from the following detailed description of some of the preferred non-limiting embodiments thereof illustrated, merely by way of non-limiting example, with reference to the appended drawings, in which.

PREFERRED EMBODIMENTS OF THE INVENTION

In the Figures, a filtering device according to a first embodiment of the invention is generally designated 1. The filtering device 1 is of jug-like form, but similarly the invention could be adapted to devices for preparing infusions, such as tea, coffee and the like. The device 1 comprises a receptacle 2 which is provided with a handle 3 and which is closed, in the upper portion, by a lid 4. The lid is in turn provided with a spring biased flap 5 which automatically closes in an openable manner a pouring spout 6 during pouring.

A container 7 is fitted to the interior of the receptacle 2 and secured to the mouth thereof, so as to define a first reservoir 8 for collecting the water to be filtered, in the bottom 9 of which a discharge conduit 10 is open. A filter cartridge 11 is removably arranged in the conduit 10. The remainder of the receptacle 2 defines a second reservoir 12 for collecting the filtered water.

The positioning of the above-described elements is such that the water introduced into the first reservoir 8 flows by means of gravity into the second reservoir 12, passing by way of the conduit 10 through the filtering material which is contained in the filter cartridge 11.

All the above-mentioned details are present in each of the embodiments of the present invention and are therefore indicated by the same reference numerals.

Figure 1:
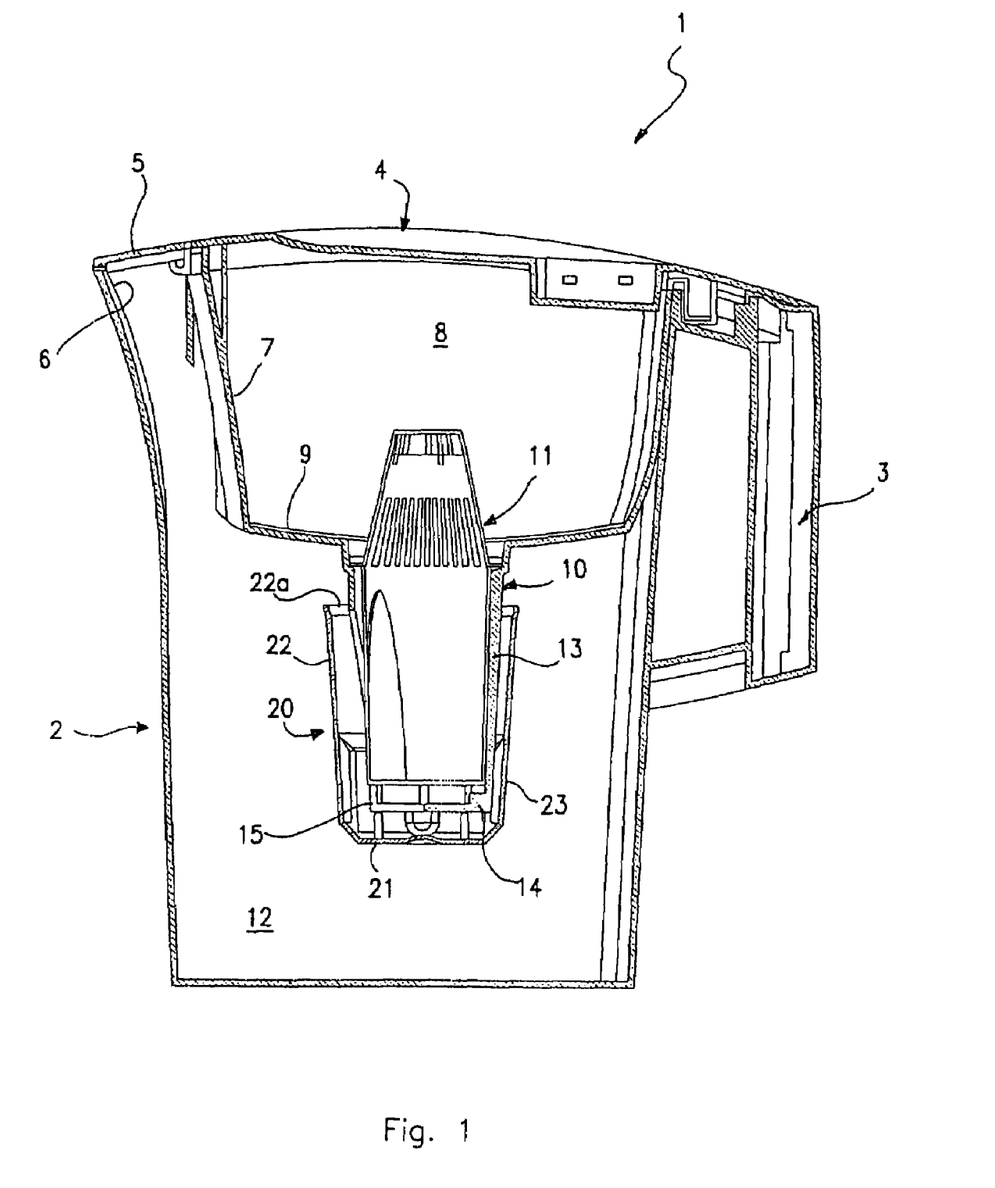
FIG. 1 is a longitudinal section of a filtering device according to a first embodiment of this invention, which device is integrated in a jug.
Figure 2:
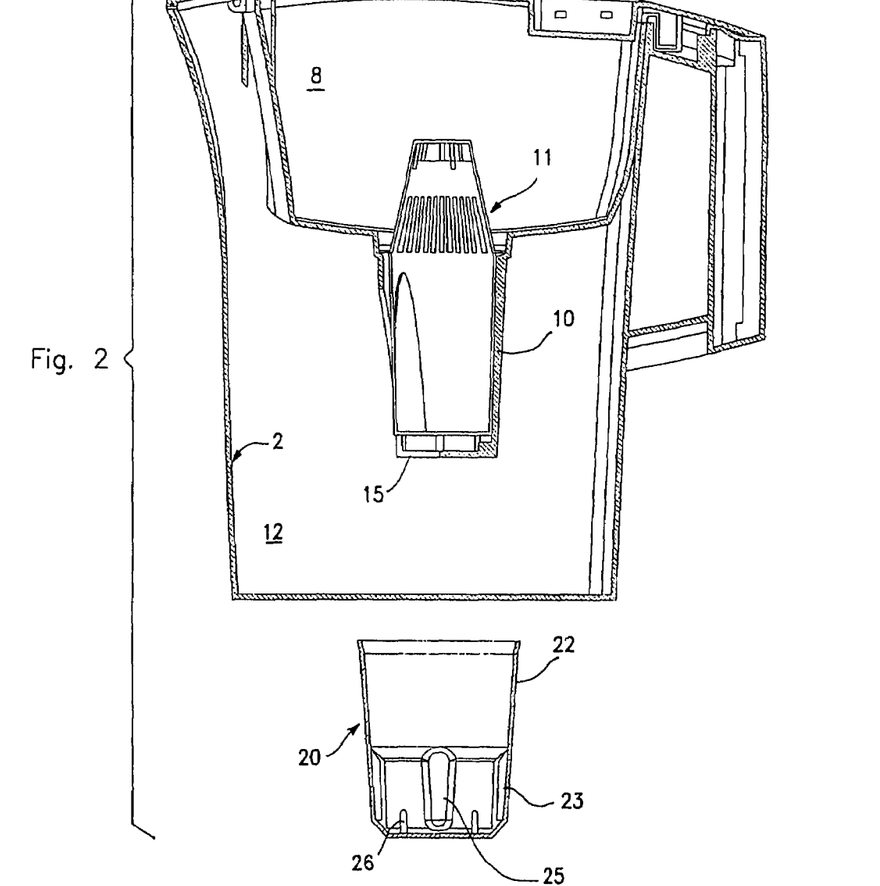
FIG. 2 is a partially exploded view of the jug of FIG. 1.

With specific reference to the embodiment of FIGS. 1 and 2, the conduit 10 has an outer surface 13 which is slightly tapered towards a base 14. There is formed in the outer surface 13 and the base 14 a discharge opening 15 which serves both to discharge the filtered water and to facilitate access to the cartridge portion 11 received in the conduit 10 in order to facilitate the removal thereof once used, as well as to allow the conduit 10 to be cleaned over the entire extent thereof.

A beaker-like construction 20 having a closed base 21 and outer surface 22 is fitted to the exterior of the conduit 10 in the region of the discharge opening 15 so as to constitute partial closure thereof, as will be explained in greater detail below. The relative position between the beaker-like construction 20 and the opening 15 is such that the filtered water being discharged from the cartridge, or from the lower portion of the discharge opening 15, has to rise up in the beaker-like construction 20 and overflow therefrom through a discharge hole 22a which is defined between the outer surface 22 and the conduit 10, in order to be introduced into the second reservoir 12. Therefore, the beaker-like construction 20 constitutes a flow regulator for the water flowing from the first reservoir to the second in order to minimize the variation in the counterpressure of the water being discharged from the cartridge owing to the effect of the variation in water level in the second reservoir. This result is obtained in that there is delimited, between the beaker-like construction 20 and the conduit 10, an upward course for the water being discharged from the cartridge 11 and directed to the discharge hole so that the discharge hole 22a is close to the first reservoir with respect to the discharge of the water from the cartridge so as to determine a counter-pressure at the outlet from the cartridge that is substantially independent of the water level in the second reservoir.

Figures 3, 4, 5, 5A, 5B:
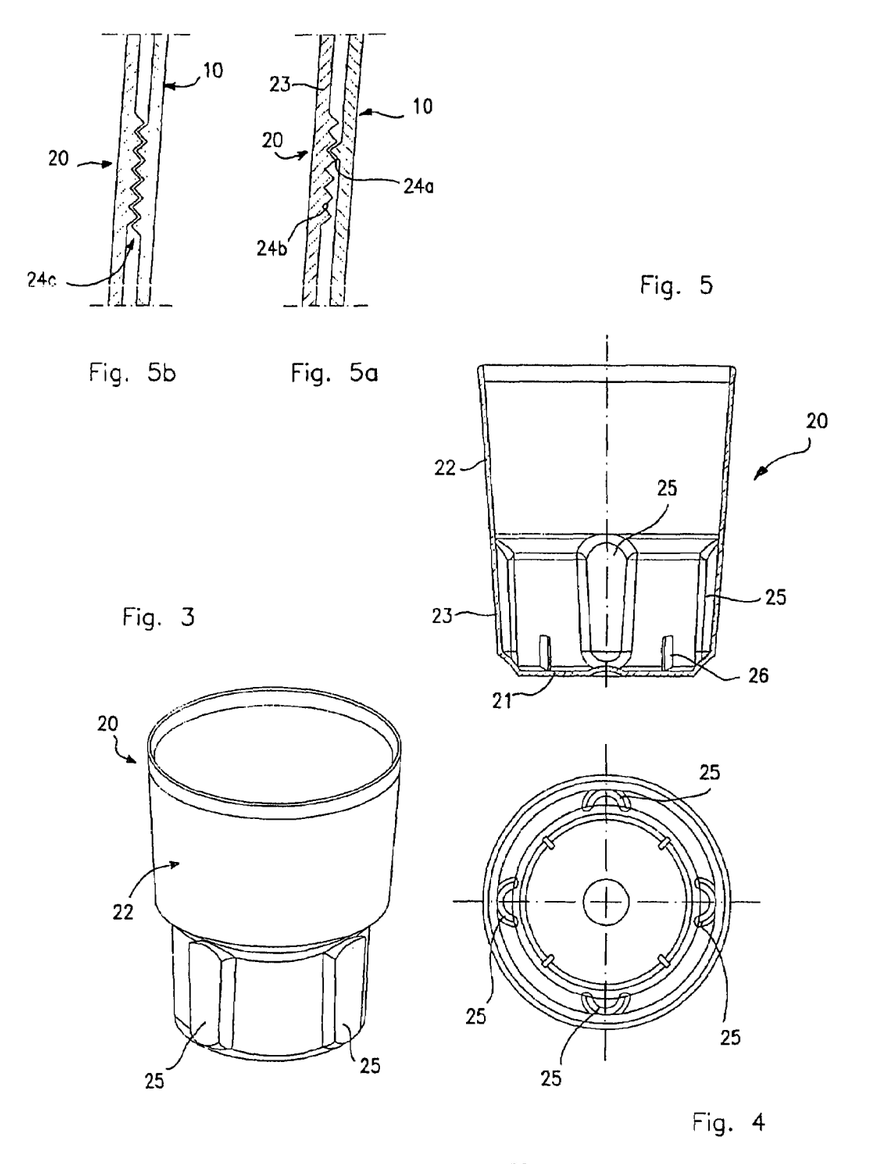
FIG. 3 is a perspective top view of a detail of the jug of FIG. 1.
FIGS. 4 and 5 are a cross-section and a longitudinal section of the detail of FIG. 3, respectively.
FIGS. 5a and 5b are views, drawn to an enlarged scale, of respective construction variants of the jug of FIG. 1.
Figure 6:
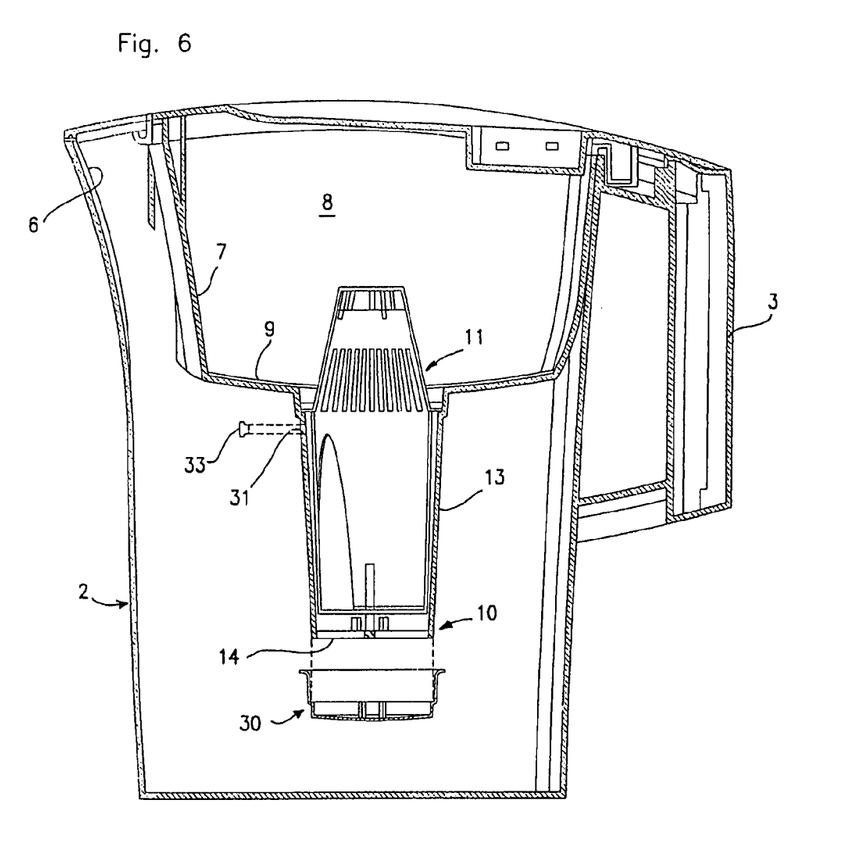
FIG. 6 is a partially exploded longitudinal section of a filtering device according to a second embodiment of this invention, which device is integrated in a jug.
Figure 7:
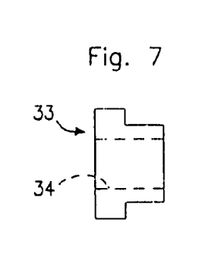
FIGS. 7 and 8 are a side view and a front view, drawn to an enlarged scale, of a detail of the jug of FIG. 6, respectively.
Figure 8:
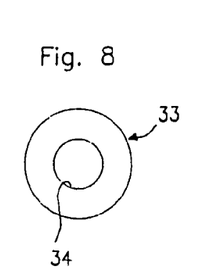
Figure 9:
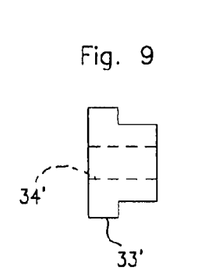
FIGS. 9 and 10 are views similar to FIGS. 7 and 8 of a construction variant of the detail represented therein.
Figure 10:
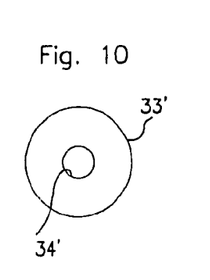

The beaker-like construction is removably secured to the outer surface of the conduit 10 in order to allow it to be cleaned and to facilitate the removal of the cartridge once the filtering capacity thereof has been used. Various removable securing means are envisaged; a first example is constructed by means of a connection with slight interference between a lower portion 23 of the outer surface 22 and the corresponding outer portion of the conduit 10, to which it is fitted. Alternatively, there is provided a snap type connection (see FIG. 5a), with teeth 24a on one and/or other of the connection surfaces and respective projections 24b on the respective other surface. In another alternative (see FIG. 5b), there is provision for the connection surfaces to be provided with respective screws and nuts 24c in order to bring about an adjustable threaded connection.

Still with a view to adjusting the flow, there is also provision for the outer surface of the beaker 20 to be provided with one or more male threaded connection(s) which is/are able to slide telescopically over the outer surface 22 in order to extend the upward range thereof.

The outer portion 23 is affected by a plurality of axially extending recesses 25, which protrude outwards so as to form channels for the passage of the filtered water. To that end, in the region of the base 21 of the beaker-like construction, there are formed fins 26 which project radially inwards and which limit the fitting of the beaker-like construction to the conduit 10.

The operation of the filtering device 1 is as follows. Introducing water into the first reservoir 8 brings about the flow thereof, by means of gravity, towards the second reservoir 12 through the filtering material of the cartridge 11. The pressure of the water at the inlet of the cartridge 11 varies in accordance with the water level in the first reservoir. The discharge pressure from the cartridge, once the conduit 10 and the beaker-like construction are full, however, remains constant during the filtration operation. By varying the position of the beaker-like construction 20 along the conduit 10, that pressure can be adjusted as desired.

In a second embodiment of the invention, the conduit 10 is open at the base 14, removably closed by a stopper 30 and the discharge hole is constituted by a hole 31 in the outer surface of the conduit 10 at a position axially remote from the stopper 30 and near the first reservoir 8. In that case, the upward course of the water being discharged from the cartridge and directed towards the discharge hole is delimited between the conduit 10 and the cartridge 11 so that that course is defined inside the conduit 10.

In this case, there is further provided a flow adjuster which comprises means for adjustably closing the discharge hole. In the embodiments of FIGS. 6 to 10, those closing means comprise a means for adjusting the cross-section of the discharge hole, which means include one or more stopper(s) 33, 33' which is/are alternately inserted, in a replaceable manner, in the hole 31 and which each have a calibrated hole 34, 34' of different diameter. The discharge hole in this case is defined and adjusted by the above-mentioned calibrated holes.

Figure 11:
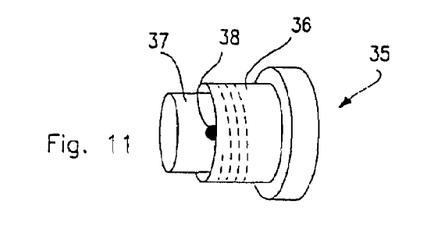
FIG. 11 is a perspective view, drawn to an enlarged scale, of another variant of the detail of FIG. 7.

In the case of FIG. 11, the means for adjusting the cross-section of the discharge hole is constructed by a shutter 35 which has an adjustable cross-section and which is inserted in the hole 31. In that case, the shutter 35 comprises a sleeve 36 which is in turn fitted in the hole 31 and internally threaded, and in which a stopper 37 is screwed, and can therefore be progressively introduced adjustably, in which stopper 37 there is formed a passage 38 constituting an adjustable discharge hole. Varying the extent to which the stopper 37 is screwed in the sleeve 35 consequently varies the discharge hole. In both cases, it is possible that, in place of the removable stopper 30, the conduit 10 is closed at the bottom by a substantially continuous wall 14.

Figure 12:
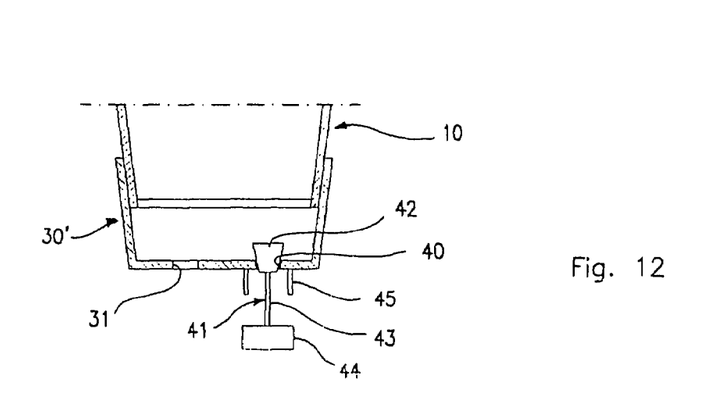
FIG. 12 is a schematic view, drawn to an enlarged scale, of a construction variant of the device according to the invention.

In another variant of the invention, schematically illustrated in FIG. 12, the closing means comprise at least one auxiliary discharge hole which is designated 40 and means for intercepting the hole, designated 41. The auxiliary hole in that case is positioned at the bottom of the conduit 10 which is closed or which has a removable stopper 30' (FIG. 12), as indicated in the preceding embodiments, or by a bottom wall of the conduit itself. The hole 31 which defines the main discharge hole can also be formed in that wall, or that hole can be constructed elsewhere.

The means 41 for intercepting the auxiliary hole are preferably of the level type, which are normally closed and able to release the hole 40 as the water level in the second reservoir increases. An example of such means provides for a shutter 42 which is connected by means of a rod-like shaft 43 to a float 44. One or more spacers 45 are provided around the hole of the hole 40 in order to prevent the float 44, as it rises towards the cartridge 11, from intercepting the auxiliary hole 40. It is advantageous to note how, by varying the length of the rod-like shaft 43, it is possible to vary the magnitude of the auxiliary hole 40 with respect to the level of liquid present in the second reservoir 12.

Figure 13:
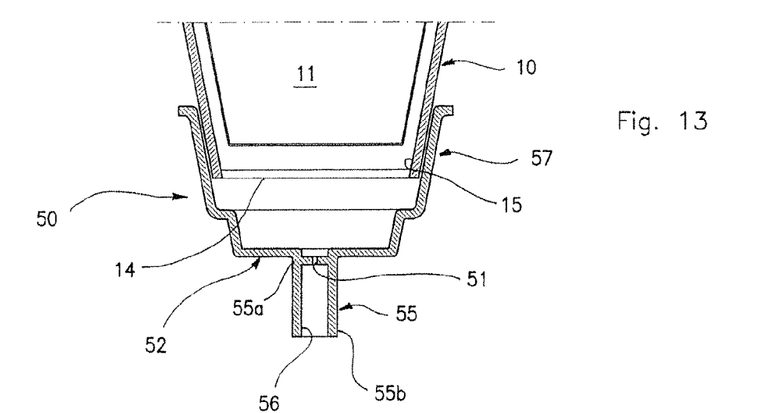
FIG. 13 is a schematic partial cross-section, drawn to an enlarged scale, of another construction variant of the device according to the invention.
Figure 14A:
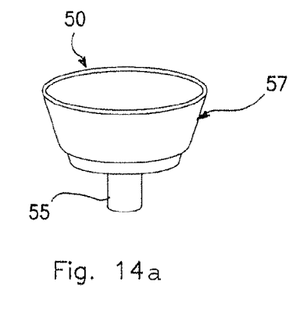
FIGS. 14a and 14b are a side view and a bottom view of a detail of the device of FIG. 13, respectively.
Figure 14B:
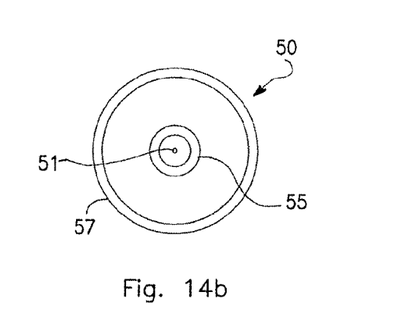

In another variant of the second preferred embodiment of the invention, wherein the base 14 is open, illustrated in FIGS. 13, 14a and 14b, the pipe 10 is removably closed by a stopper 50 which comprises a bottom wall 52.

A sleeve 55, which is preferably cylindrical about an axis and which comprises a first end 55a and a second end 55b which are axially opposed and the first of which is fixed to the bottom wall 52, extends from the bottom wall 52 of the stopper 50 in the opposite direction with respect to the pipe 10. The sleeve 55 comprises an inner channel which continues axially so as to extend through the bottom wall 52 so as to define an opening therein so that the water which accumulates in the bottom wall 52 can be discharged into the second reservoir 12 by means of the channel.

The internal cross-section of the channel is closed by a wall 56, which is preferably arranged perpendicularly relative to the axis of the sleeve and which has a hole 51 which is preferably provided centrally relative to the wall 56 and which defines the hole for the water to flow from the first reservoir to the second reservoir. The wall 56 is preferably provided near the first end 55a of the sleeve 55; however, the present invention comprises stoppers which include a sleeve whose closure wall 56 is provided in any position along the axis thereof.

In the preferred example of FIGS. 13, 14a, b, the stopper 50 further comprises an outer surface 57 which is preferably cylindrical and which allows the stopper to be fixed to the pipe 10, preferably by means of a fixed coupling. Preferably, the axis of the outer surface 57 and the sleeve 55 are mutually parallel, more preferably they are coincident with each other.

Figure 15:
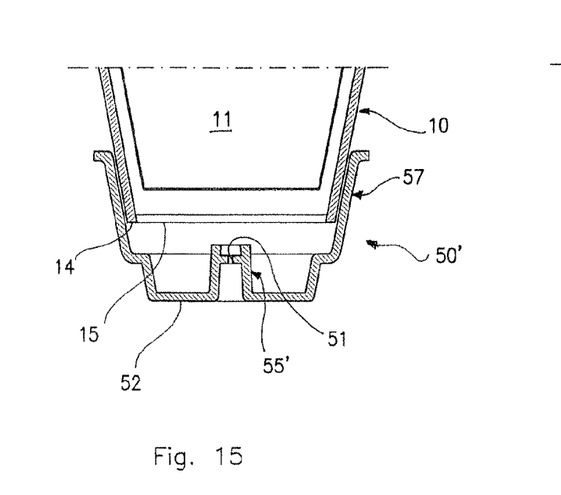
FIG. 15 is a schematic partial cross-section, drawn to an enlarged scale, of another construction variant of the device according to the invention.

According to a variant of the invention illustrated in FIG. 15, in which details which are similar to those described above with reference to FIGS. 13, 14a, 14b are referred to with the same reference numerals, the removable stopper 50, includes a sleeve 55' which projects from the bottom 52 in the direction of the pipe 10. The sleeve 55' and stopper 50' have suitable dimensions so as to prevent contact between the free end of the sleeve 55' and the pipe 10. The sleeve 50' includes a closure wall which is preferably provided near the free or second end of the sleeve and which comprises the hole 51.

Figure 16:
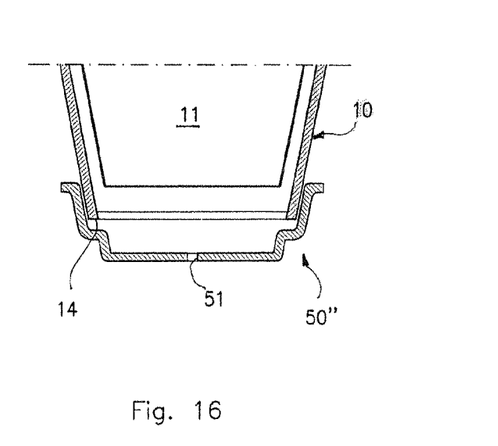
FIG. 16 is a schematic partial cross-section, drawn to an enlarged scale, of another construction variant of the device according to the invention.

In addition, according to another variant of the stopper of the invention, designated 50" in FIG. 16, the calibrated hole 51 is constructed directly in the bottom of the stopper 50" and there is not provided any sleeve type formation.

The invention thereby solves the problem addressed leading to a number of advantages. Firstly, there is obtained a decisive stabilisation of the flow rate with respect to variations in the filling states of both reservoirs. It is further possible to expel the cartridge from the conduit by pressing from below, which allows the geometry of the cartridge not to be determined from this viewpoint. Thirdly, the conduit can readily be cleaned over the entire extent thereof with an advantage in terms of the hygiene of the filtering device. It is further possible to adjust the flow of water during filtration to ensure optimum results for that operation.

The invention claimed is:

1. A filtering device for filtering water and liquids comprising:
    a first reservoir for collecting the water to be filtered,
    a second reservoir for collecting the filtered water, which reservoir is supplied by falling from the first reservoir;
    a conduit which extends from the first reservoir into the second reservoir;
    a cartridge type filtering element which is removably received in that conduit;
    a discharge hole for the filtered water that is positioned between the conduit and the second reservoir;
    the conduit having, at a distal end from the first reservoir and, at said distal end, at least one opening for access to the cartridge in order to promote the removal thereof, said device further comprising an at least partial closure which can be removably fitted to the conduit in the region of the opening for access to the cartridge, and a flow adjuster which is associated with the conduit in order to adjust the flow of water flowing from the first reservoir to the second reservoir through the discharge hole.

2. A filtering device according to claim 1, wherein the flow adjuster is such that it minimizes the variation in the counter-pressure of the water being discharged from the cartridge by the effect of the variation in water level in the second reservoir.

3. A filtering device according to claim 1, wherein the flow adjuster comprises means for delimiting an upward course for the water being discharged from the cartridge and directed towards the discharge hole so that the discharge hole is near the first reservoir with respect to the discharge of the water from the cartridge so as to determine a counter-pressure at the outlet from the cartridge that is substantially independent of the water level in the second reservoir.

4. A filtering device according to claim 3, wherein the delimiting means are positioned relative to the conduit so that the course is defined inside that conduit between the conduit and the cartridge.

5. A filtering device according to claim 3, wherein the delimiting means are positioned relative to the conduit so that the course is defined outside the conduit between the conduit and a beaker-like construction which is fitted to the conduit.

6. A filtering device according to claim 5, wherein the beaker-like construction can be removed from the conduit and constitutes the closure of the conduit.

7. A filtering device according to claim 6, wherein the beaker-like construction is fitted to the conduit with snap engagement.

8. A filtering device according to claim 5, wherein the beaker-like construction is positioned in an adjustable manner in the axial direction of the conduit.

9. A filtering device according to claim 8, wherein the beaker-like construction is screwed to the conduit.

10. A filtering device according to claim 5, wherein the beaker-like construction is fitted to the conduit with interference.

11. A filtering device according to claim 5, wherein the beaker-like construction has an outer surface which can be extended in an adjustable manner with respect to the base.

12. A filtering device according to claim 1, wherein the flow adjuster comprises means for adjustably closing the hole.

13. A filtering device according to claim 12, wherein the closing means comprise a means for adjusting the cross-section of the hole.

14. A filtering device according to claim 13, wherein the adjusting means is of the type having a calibrated hole fitted to a stopper which can be removably inserted in the hole.

15. A filtering device according to claim 13, wherein the closing means comprise at least one auxiliary hole and means for intercepting the auxiliary hole.

16. A filtering device according to claim 15, wherein the means for intercepting the auxiliary hole are of the level type and can release the auxiliary hole as the water level in the second reservoir increases.

17. A filtering device according to claim 16, wherein the intercepting means are of the float type.

18. A filtering device according to claim 12, wherein the closing means comprise a shutter which has an adjustable cross-section and which is inserted in the hole.

* * * * *

UNITED STATES PATENT AND TRADEMARK OFFICE
CERTIFICATE OF CORRECTION

PATENT NO. : 7,722,761 B2  
APPLICATION NO. : 11/983331  
DATED : May 25, 2010  
INVENTOR(S) : Maurizio Moretto Page 1 of 1

It is certified that error appears in the above-identified patent and that said Letters Patent is hereby corrected as shown below:

Column 1, line 3:

After the title and before the section entitled "TECHNICAL SCOPE" please insert:

-- RELATED APPLICATIONS

This application is a continuation of PCT/IT06/000393, filed on May 25, 2006, which claims foreign priority from EP 05028302.7 filed on December 23, 2005 and IT PD2005A000153 filed on May 25, 2005. --

Signed and Sealed this
Seventeenth Day of April, 2012

David J. Kappos
*Director of the United States Patent and Trademark Office*